(12) United States Patent
Müller et al.

(10) Patent No.: US 7,497,232 B2
(45) Date of Patent: Mar. 3, 2009

(54) PRESSURE CONTROL VALVE

(75) Inventors: Falk Rainer Müller, Lohr (DE); Roland Gerhart, Hafenlohr (DE)

(73) Assignee: Hydraulik-Ring GmbH, Marktheidenfeld (DE)

(*) Notice: Subject to any disclaimer, the term of this patent is extended or adjusted under 35 U.S.C. 154(b) by 493 days.

(21) Appl. No.: 11/114,555

(22) Filed: Apr. 26, 2005

(65) Prior Publication Data

US 2006/0016492 A1 Jan. 26, 2006

(30) Foreign Application Priority Data

Apr. 26, 2004 (DE) .................. 10 2004 020 268

(51) Int. Cl.
*F15B 13/044* (2006.01)
(52) U.S. Cl. .............. 137/625.26; 137/625.65; 137/596.17; 251/129.07
(58) Field of Classification Search ............ 137/625.26, 137/625.27, 625.65; 251/129.07
See application file for complete search history.

(56) References Cited

U.S. PATENT DOCUMENTS

| | | | | |
|---|---|---|---|---|
| 147,949 A | * | 2/1874 | Koeth .................... | 137/625.26 |
| 2,638,108 A | * | 5/1953 | Williams et al. ........ | 137/625.26 |
| 2,837,148 A | * | 6/1958 | Jay ........................ | 137/625.26 |
| 2,893,428 A | * | 7/1959 | Collins ................... | 137/625.65 |
| 3,174,511 A | * | 3/1965 | Parker .................... | 137/625.65 |
| 4,209,040 A | * | 6/1980 | Peters .................... | 137/625.26 |
| 4,998,559 A | | 3/1991 | McAuliffe, Jr. | |
| 6,109,300 A | | 8/2000 | Najmolhoda | |
| 6,206,038 B1 | * | 3/2001 | Klein et al. ............. | 137/625.26 |
| 6,315,268 B1 | | 11/2001 | Cornea et al. | |
| 6,328,065 B1 | | 12/2001 | Schmid et al. | |
| 6,386,218 B1 | * | 5/2002 | Ness et al. ............. | 137/625.26 |
| 6,837,451 B2 | * | 1/2005 | Rodriguez-Amaya et al. .... | 137/625.26 |
| 2002/0053362 A1 | | 5/2002 | Frei et al. | |

FOREIGN PATENT DOCUMENTS

| | | |
|---|---|---|
| DE | 695 16 804 T2 | 5/1996 |
| DE | 197 47 307 A1 | 6/1998 |
| DE | 199 06 250 A1 | 5/2000 |

* cited by examiner

*Primary Examiner*—John Rivell
(74) *Attorney, Agent, or Firm*—Jones Day

(57) ABSTRACT

A pressure control valve is provided, in particular an electromagnetic pressure control valve, with a magnetic component which has at least one electrical coil and a relocatably supported armature at least partially within the coil. Furthermore, a valve component is provided which comprises a supply, a runback, a load connection and a valve element, in which the valve element in turn has a gate valve and a globe valve.

24 Claims, 8 Drawing Sheets

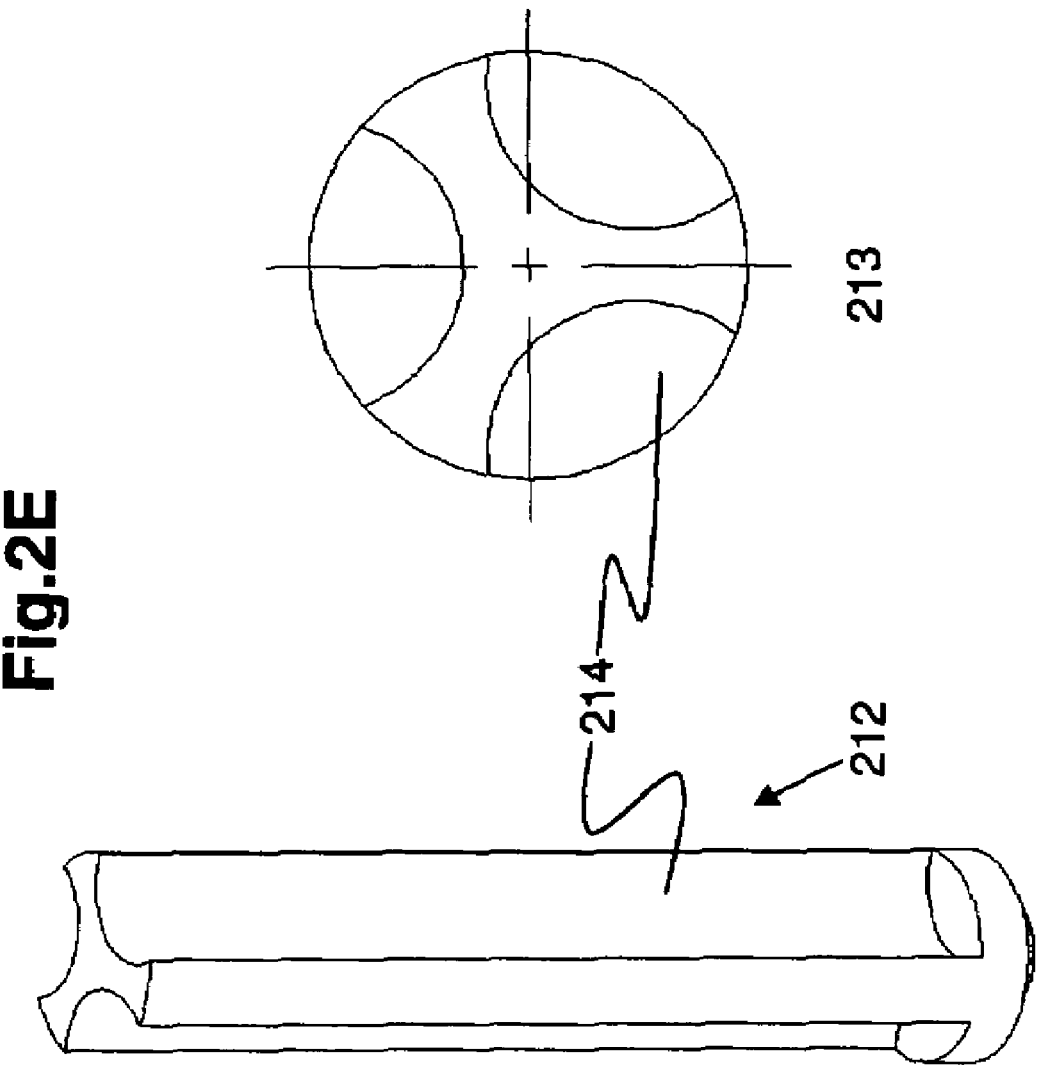

PRESSURE CONTROL VALVE

Figure 1:
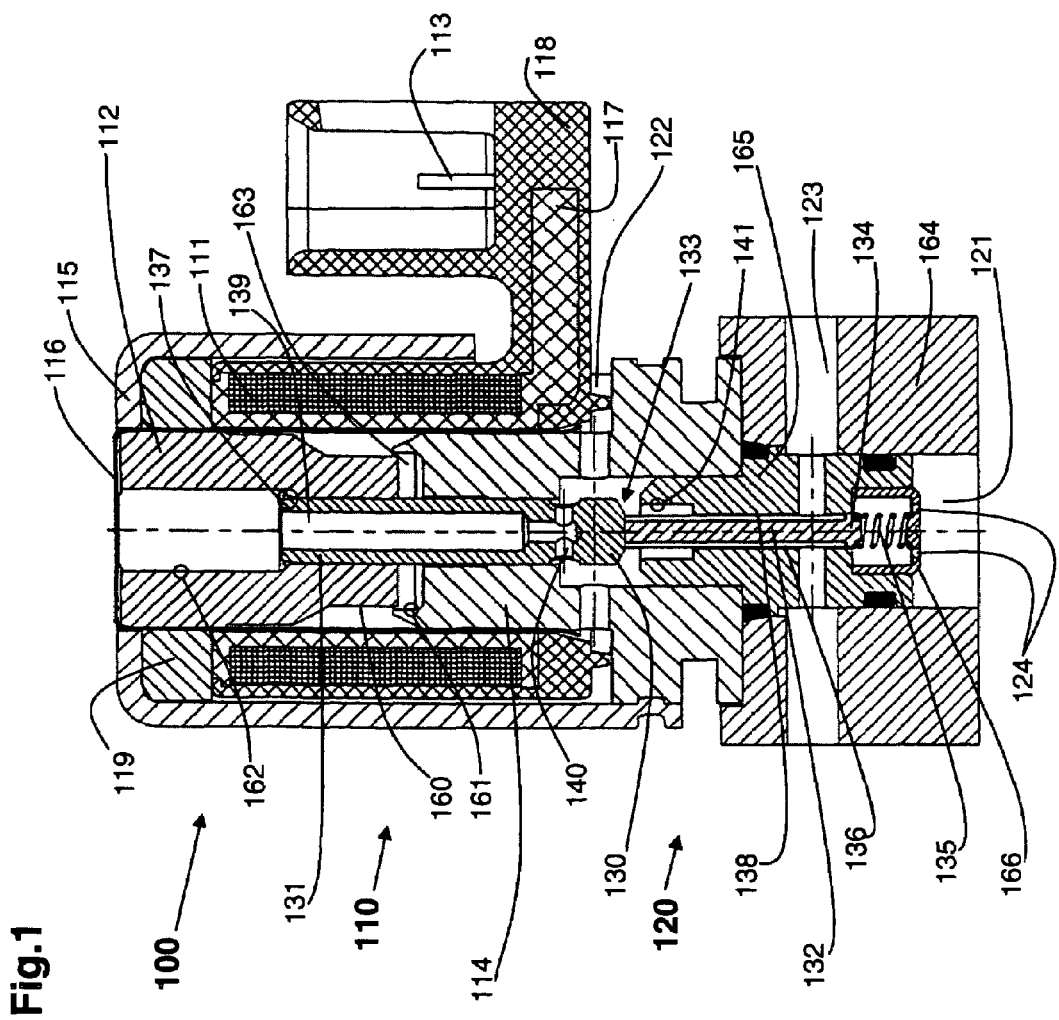

The invention relates to a pressure control valve, in particular to an electromagnetic pressure control valve.

From [1], an electromagnetic pressure control valve is known, with a magnetic component from an electrical coil, a coil core and a relocatable armature. Thereby, the pressure control valve comprises a supply, a runback, a load connection and a valve element which interacts with the armature, in which a first and a second globe valve are provided within a valve component.

Here, it is a drawback that the valve which is shown in [1] requires a complex production due to the two globe valves.

The object of the invention is to provide a pressure control valve which can be manufactured simply and which has in the sealed state only a reduced leakage via the supply.

This object is achieved according to the features of the independent patent claim. Embodiments of the invention arise from the dependent claims.

For the solution of the problem, a pressure control valve is provided, in particular an electromagnetic pressure control valve, with a magnetic component which has an electrical coil and a relocatably supported armature at least partially within said coil. Furthermore, a valve component is provided which comprises a supply, a runback, a load connection and a valve element, wherein the valve element in turn has a gate valve and a globe valve.

Thereby, it is an advantage that the gate valve in the inactive or sealed state of the valve (i. e. if no electrical current flows through the coil) seals the flow of a fluid, for example of an oil or of a gear oil from the supply to the load connection or to the runback. Thereby, preferably, the load connection can be provided for the hydraulic control for example of actuators for the adjustment of the camshaft and/or of actuators in the gear box of a motor car. The runback collects the fluid within a reservoir, from which, for example, it is pumped into the supply of the pressure control valve by means of a pump.

In case that an electrical current flows through the coil, the armature is moved within the coil and opens in an interaction via the valve element the gate valve, so that the fluid can flow via the supply to the load connection and also (albeit in a reduced amount) to the runback. If the electrical current through the coil is further increased, then the gate valve gradually reduces the flow of the fluid via the runback, accordingly the pressure via the load connection is increased, because with increasing current increasingly less of the fluid which is supplied via the supply can escape via the runback. Preferably, by means of the electrical current through the coil, the pressure onto the load connection is controlled linearly within a wide range. In other words, the electrical activation of the coil allows a preferably nearly linear control of the pressure via the load connection. Thereby, the control can be carried out in dependence on the valve's layout design also inversely, i. e. with increasing electrical current, the pressure which is controlled via the load connection, decreases.

Here, it is an advantage that in an inactive state the gate valve seals preferably completely the duct between the supply and load connection respectively the runback, so that at best a minimal leakage along the gate valve is possible. Dependent on the production accuracy, said leakage can be minimized so that in the sealed state of the gate valve nearly no fluid can flow through the supply.

An embodiment consists therein that the globe valve respectively the gate valve are designed as a sealing element, respectively.

In another embodiment, the valve element comprises a pin which interacts with the armature. So, it is possible that the armature which is movable by means of the electrical current flow through the coil, transfers its motion to the pin.

In particular, it is an embodiment that the pin's end which is turned away from the magnetic component, is designed as a globe valve, in which the valve element interacts with a control borehole. Preferably, via said globe valve, a throttle function of the pressure control valve is regulated by means of the current entry through the coil. By increasing the electrical current through the coil, the armature moves more into the coil and bears the valve element against the control borehole. Thereby, the fluid flow from the supply to the runback is reduced, whereby the pressure within the load connection is increased.

An embodiment consists therein that the pin comprises an axial hole and a cross-hole, through which the fluid can flow into the interior of the armature which also has a hole accommodating the pin. Here, preferably, the pin has along its interacting connection with the armature (for example along its interference fit with the armature) a means for the fluid guidance, for example a groove within the armature. Via said groove, the fluid can flow into the working gap of the armature. So, in particular, the expansion spaces within the coil which, for example, are needed by the armature for its motion, are filled with the fluid. If the armature moves, a corresponding displacement of the fluid is ensured via the means for the fluid guidance (the exemplarily mentioned groove between armature and pin), so that the armature is movable. The motion of the armature displaces the fluid via the means for the fluid guidance at the armature, further via the hole and the cross-hole of the pin into the fluid circulation, in particular to the runback.

For example, the means for the fluid guidance is at least one armature groove in the armature borehole.

Another embodiment consists therein that the valve element comprises a tappet which is actuated by means of the pin. Preferably, thereby a control borehole is provided for the tappet which can be moved via the pin end which preferably is designed as the movable portion of a globe valve along the control borehole.

It is an embodiment that one end of the tappet is designed as gate valve which separates the supply from runback and load connection.

Thereby, the gate valve preferably is designed in a manner that it fits into the control borehole of the tappet as exactly as possible and is simultaneously movable. Said fit of the tappet can be provided for a certain length of the tappet which in particular is determined thereby that by the movement of the tappet (via pin and armature) by applying an electrical current at the coil, the gate valve opens, i. e. the described fit is shifted from the control borehole in direction of the supply, and the fluid which is applied via the pressure at the supply can enter the control borehole by passing the fit of the tappet. Thereby, the tappet preferably is designed in a manner that the fluid can flow from the supply to the load connection and to the runback.

So, it is an embodiment that the tappet is designed in a manner that along a control borehole which surrounds said tappet, a fluid can flow at least partially. Thereby, it is possible that during the opened gate valve the fluid can flow from the supply to the load connection respectively to the runback through the control borehole in which the tappet is accommodated. For example, this can be achieved thereby that the tappet has at least along one portion of its length at least one tappet groove. Such a groove, for example, can be designed in an angular, round or both angular and round manner. Furthermore, the tappet can have several recesses, both angular and round which present several tappet grooves.

One embodiment consists therein that the fluid flows through a cavity within the tappet from the supply to the load connection respectively to the runback. For example, such a cavity can be provided after the gate valve and can provide in predetermined spacings grooves or holes which penetrate the tappet in cross-direction to the cavity and thus enable the fluid flow for example out from the cavity, in particular to the load connection respectively to the runback.

Another possibility to provide the fluid flow through respectively along the tappet when the gate valve is opened, is to provide a thread-shaped round groove, in particular on the exterior of the tappet following the gate valve, so that along said thread-shaped round groove the fluid can flow from the supply to the load connection respectively to the runback.

Another embodiment consists therein that a spring is provided which presses the tappet in direction of the pin. This effects that in the inactive switch, so when no electrical current flows through the coil and moves the armature, the gate valve is sealed and thus the fluid flow from the supply to the load connection respectively to the runback is (preferably completely) cut off.

An embodiment consists therein that the tappet has a tappet orifice. As soon as the gate valve opens, the fluid flows via said tappet orifice from the supply in direction of the load connection and in direction of the runback. Preferably, the function of said tappet orifice is realized by means of an extended groove along the tappet or by means of a cross-hole through the tappet. In case of the cross-hole, in particular the tappet has a hole in its interior, so that the fluid can flow through the cross-hole through the tappet. Furthermore, such a tappet can comprise loading grooves or further cross-holes, so that at certain positions along the tappet the fluid can flow through the borehole outwards.

As an alternative embodiment, the orifice can also be provided in the globe component.

Another embodiment consists therein that in the magnetic component of the pressure control valve a spring is provided by means of which a spring force can be exerted on the armature. Thereby, the spring can be provided between the housing and the armature and/or the pin, whereby, preferably, armature and pin are connected with each other via an interference fit. By means of the described spring, the pressure force is compensated which exerts via the supply onto the tappet. So, nearly the total magnetic force is available for the pressure control.

It is also an embodiment that an additional duct between supply and load connection is provided, in particular within the valve component of the pressure control valve which is essentially sealable by means of the gate valve. Such a duct can save the formation of a tappet groove or of another backflow possibility between the control borehole and the tappet. If the tappet opens, a connection is produced between the supply and the load connection as well as supply and runback before the globe valve into the control borehole.

Another embodiment consists therein, that via the control of the globe valve by means of the electrical current which flows through the coil, the pressure at the load connection is controllable over an at least partially essentially linear range.

It is also an embodiment that the magnetic component comprises a coil core which is designed as at least partially dipping into the coil.

Furthermore, it is an embodiment that the gate valve is provided within the supply of the valve component.

An embodiment consists therein that the globe valve is provided in the runback of the valve component.

Subsequently, examples of the invention are illustrated and discussed by means of the drawings.

Figure 2A:
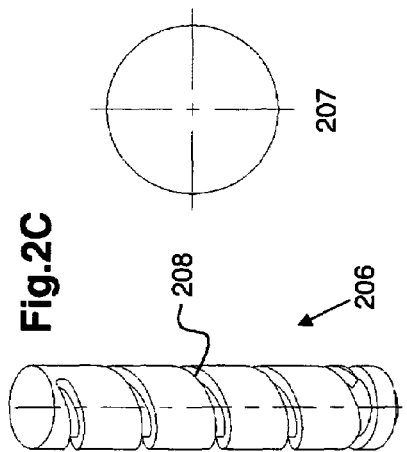
Figure 2B:
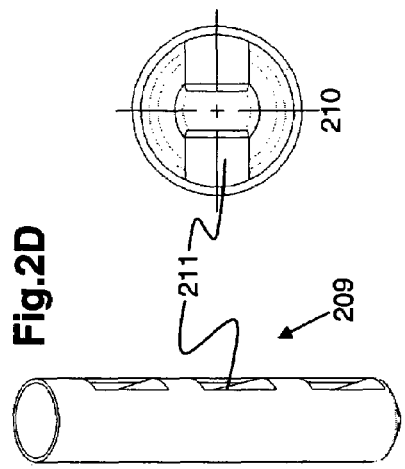
Figure 2C:
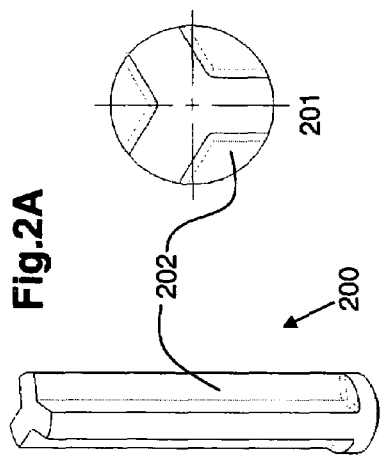
Figure 2D:
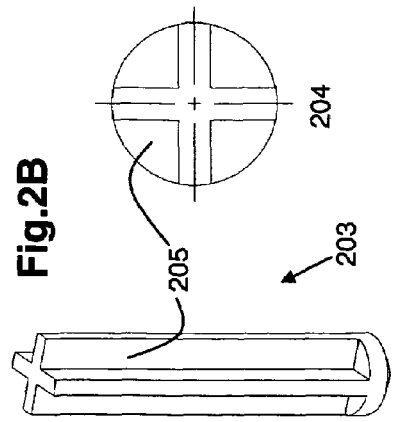
Figure 3:
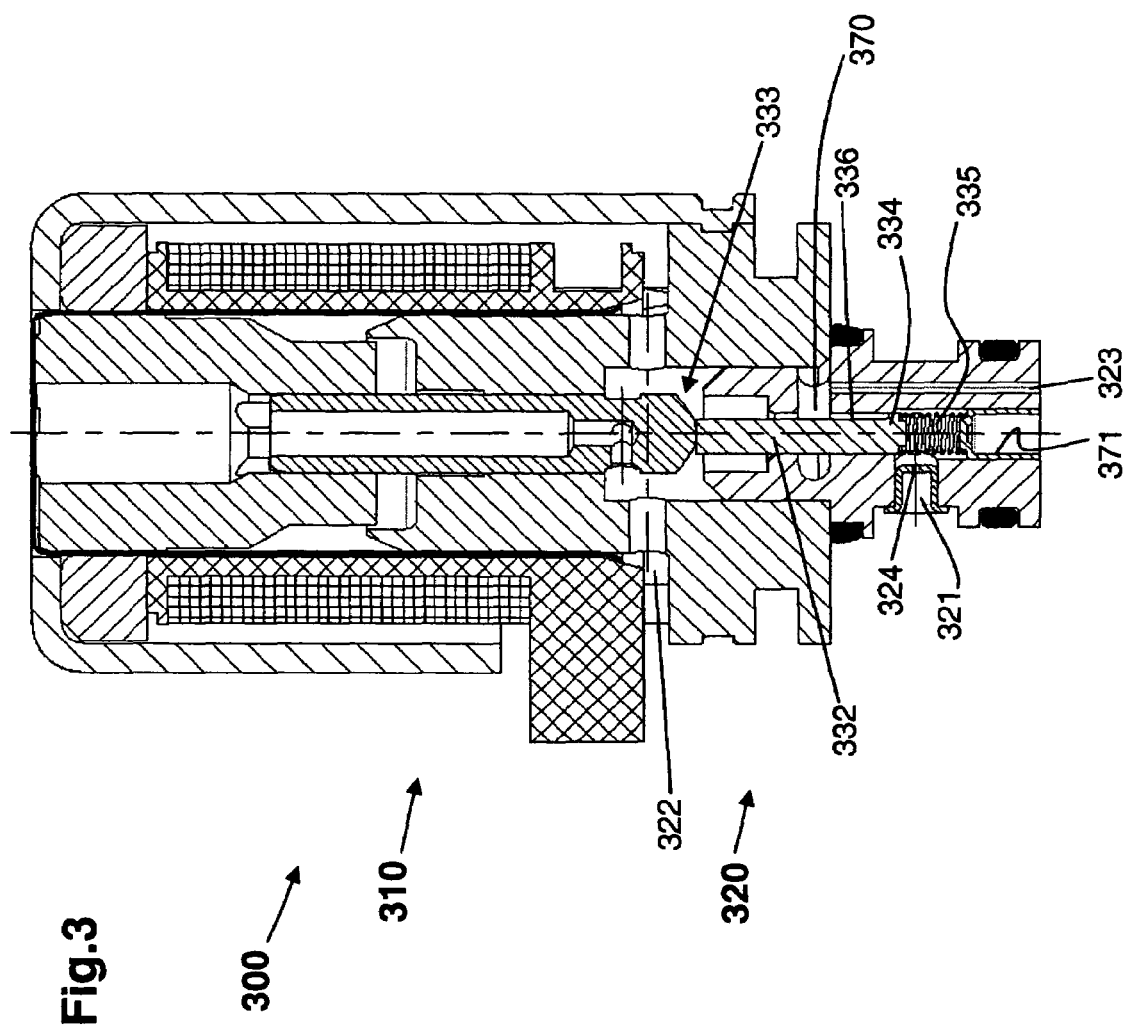
Figure 4:
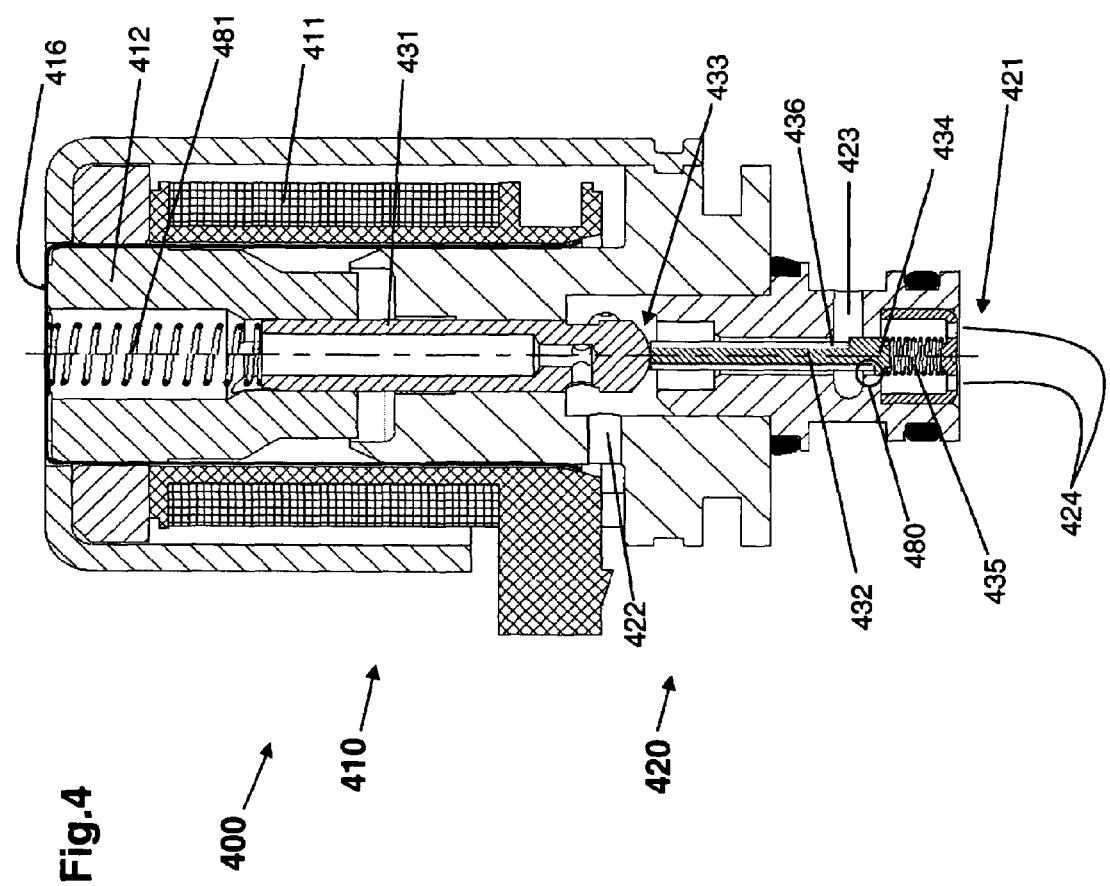
Figure 5B:
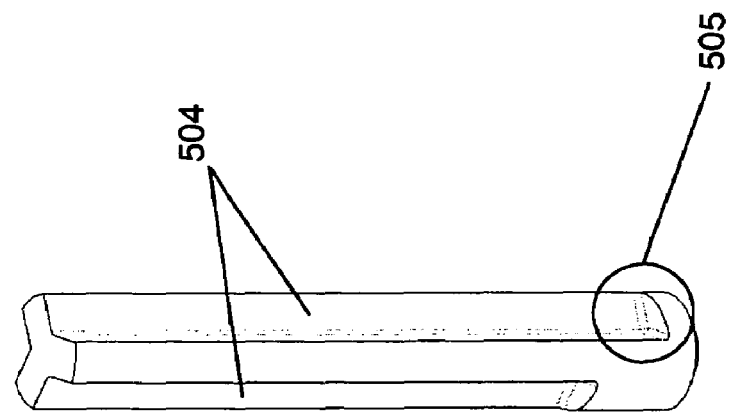
Figure 5A:
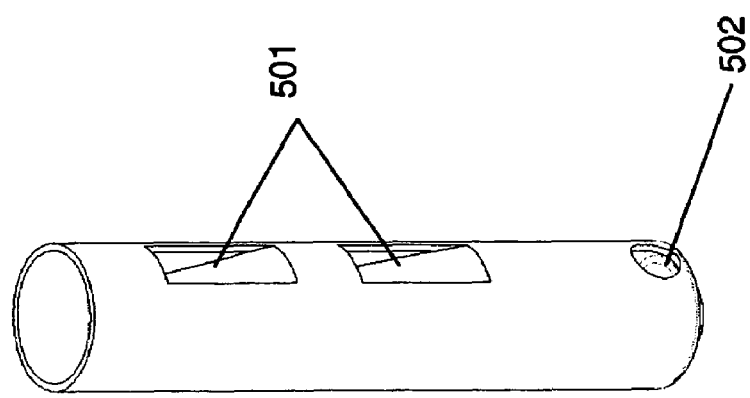
Figure 5C:
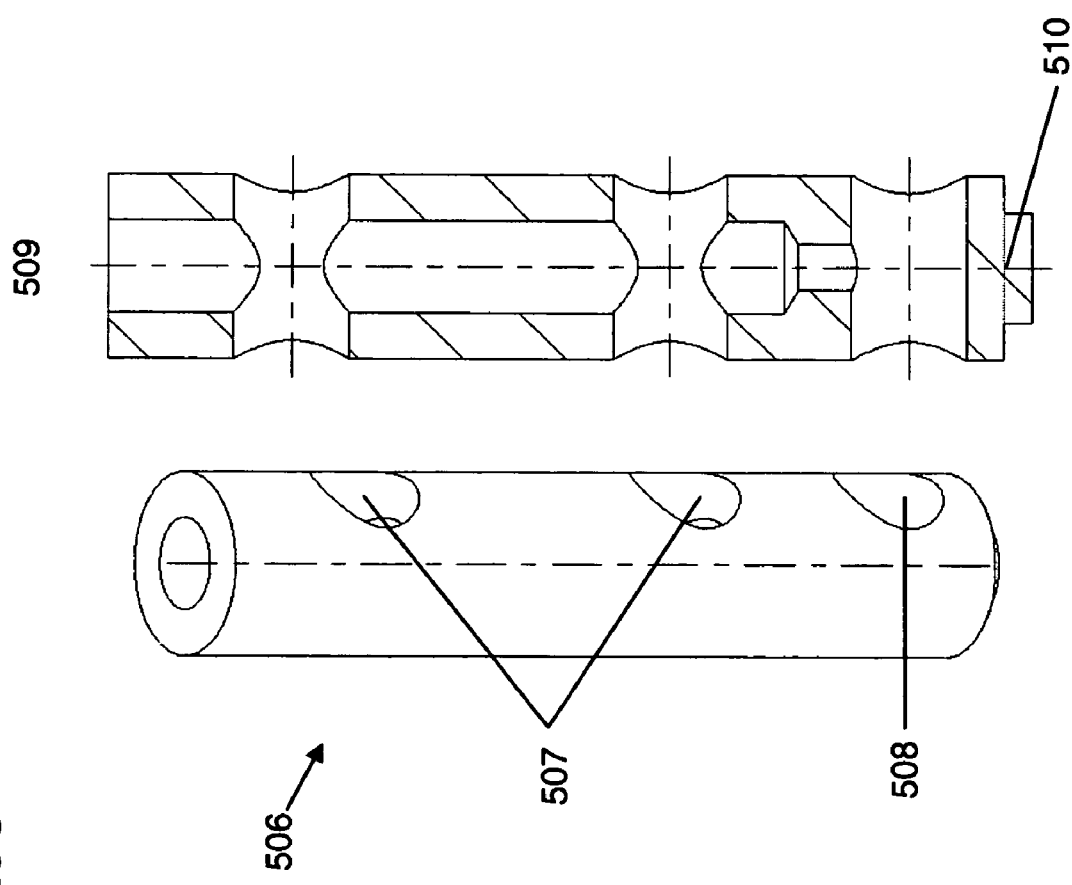
Figure 6:
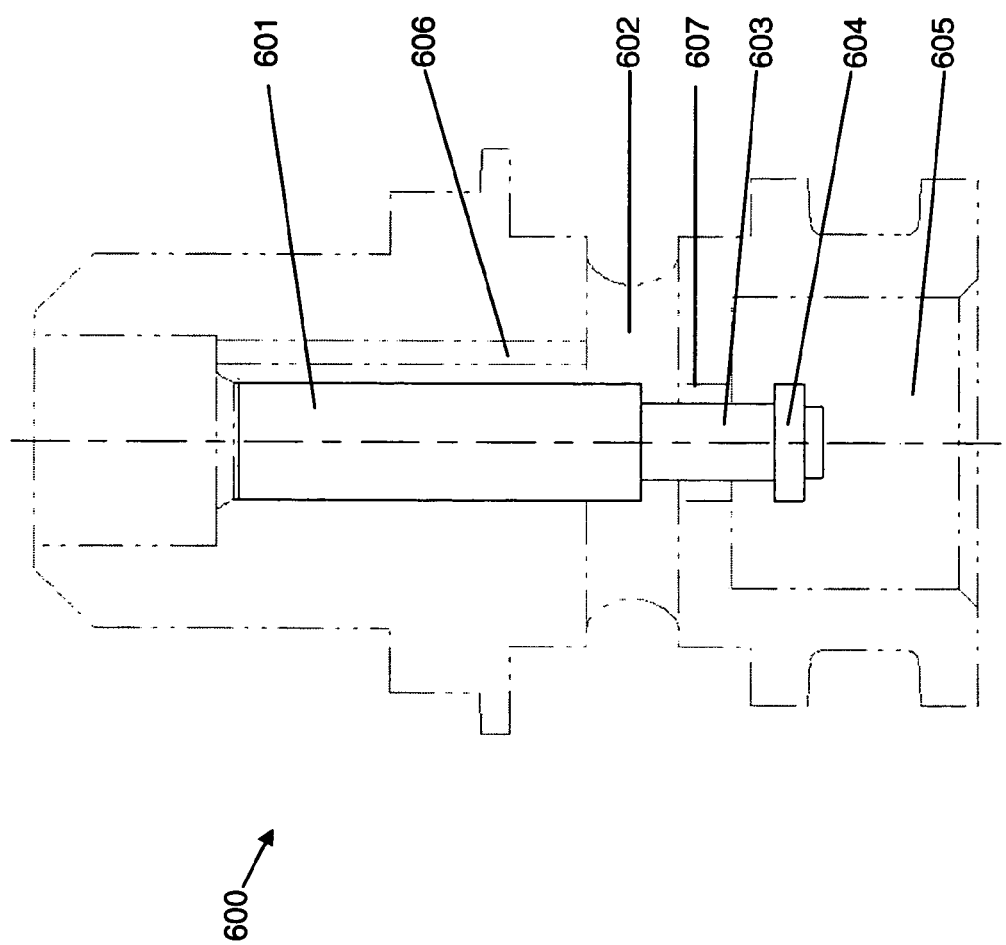

The figures show:

FIG. 1 an electromagnetic pressure control valve in longitudinal section;

FIG. 2A a tappet cross-sectional form with three angular recesses;

FIG. 2B a tappet cross-sectional form with four angular recesses;

FIG. 2C a tappet cross-sectional form with a helically revolving groove;

FIG. 2D a tappet cross-sectional form with a cavity and lateral openings;

FIG. 2E a tappet cross-sectional form with round recesses;

FIG. 3 an alternative embodiment of a pressure control valve with a modified load connection;

FIG. 4 an alternative embodiment of a pressure control valve with an armature spring and a tappet orifice;

FIG. 5A a tappet cross-sectional form with a cavity, lateral openings and a tappet orifice;

FIG. 5B a tappet cross-sectional form with angular recesses, wherein one recess is provided in a longer manner compared to the other recesses;

FIG. 5C a tappet cross-sectional form with a cavity, crossholes and an integrated tappet orifice;

FIG. 6 an adapter with a tappet.

In FIG. 1, an electromagnetic pressure control valve 100 with a magnetic component 110 and a valve component 120 is illustrated. The magnetic component is surrounded by a housing 115 and comprises a coil 111 which is mounted on a coil body 117 which in turn is surrounded by a coil housing 118. The current supply of the coil 111 is carried out by means of an electrical connection as for example a connection assembly 113 and further conductors which are not shown.

The interior of the coil 111 further comprises an internal housing 116 in which an armature 112 and a coil core 114 are provided, in which the coil core 114 is arranged at the end of the magnetic component 110 which is turned towards the valve component 120, and which dips partially into the interior of the coil 111. The coil core 114 has in its interior an axial borehole with portions of different diameters.

Between housing 115 and coil body 117, around the internal housing 116 a pole flange 119 is arranged in order to ensure the magnetic flow to the armature 112 within the pressure control valve 100.

The armature 112 has on its side which is aligned in direction with the coil core 114, a nose 160 which is adjusted to a shaping 161 of the coil core 114, so that the armature 112 can dip into the coil core 114 over a predetermined range. A working gap 163 is present between armature 112 and coil core 114.

Along its longitudinal axis, the armature 112 has a longitudinal borehole 162, with a slightly bigger diameter approximately from the center of the armature 112, in direction to the side which is turned away from the valve component 120.

Along its longitudinal borehole 162 with minor diameter, the armature 112 comprises a pin 131 which is pressed into the armature 112 and therewith interacts with said armature 112 in a manner, that it is movable together with the armature 112.

If no electrical current flows through the coil 111, then the armature 112 is in rest position as shown in FIG. 1.

In particular, the valve component 120 comprises a supply 121 which is in connection with a pump (not shown), a runback 122 which preferably is designed as ring duct and which feeds the fluid to a reservoir (not shown) and a load connection 123 which for example is provided as loading duct and which, for example, is connected with a hydraulic actuator (not shown). By means of the armature 112, a valve element 130 is actuated.

The coil core 114 comprises in direction of the valve component 120 within the portion in which it protrudes from the coil 111 the runback 122 in form of a loading duct. The interior of the coil core 114 has in the end of its borehole which protrudes from the coil 111 a portion of a bigger diameter and accommodates at least partially a connection element 165 which is pressed in.

The connection element 165 comprises a control borehole 138 for the accommodation of a tappet 132 which is in interaction with the globe valve 133 in a manner that it is movable in the control borehole 138 by means of the motion of the armature 112, and therefore of the pin 131. Furthermore, the connection element 165 has a control borehole 141 for the globe valve 133 on the side which is turned to the magnetic component 110. On the side which is turned away from the magnetic component 110, the connection element 165 has a borehole which is pressed into a cap 166 in a manner that a spring 135 actuates by means of support onto the internal side of the cap 166 on the tappet 132 in the control borehole 138. The tappet 132 shows a broadening on its side which is turned away from the magnetic component which is flush with the control borehole 138 and which functions as gate valve 134. Said broadening only relates to the end of the tappet 132 and preferably is designed in a manner that—provided that the broadening i. e. the gate valve 134, is introduced into the control borehole 138—nearly no fluid can flow from the supply 121 to the runback 122 respectively from the supply 121 to the load connection 123. If the gate valve 134 is moved in direction from the magnetic component, and if the broadening of the gate valve 134 leaves the control borehole 138, then by means of at least one groove 136 along the tappet below the gate valve 134 in direction of the magnetic component 110, a fluid flow is possible from the supply 121 to the load connection 123, respectively from the supply 121 to the runback 122. The globe valve 133 reduces the fluid flow from the supply 121 to the runback 122 with increasing electrical current through the coil 111 thereby that the armature 112 and therewith the pin 131 moves in direction to the valve component 120 and so seals the globe valve 133 and therewith increases the pressure onto the load connection 123.

Furthermore, the adapter 165 comprises a loading borehole to the load connection 123. A completion geometry 164, for example an installation space as constituent of a gear block comprises the adapter 165 and creates by means of at least one loading borehole the load connection 123 and by means of a borehole the supply 121. The feed of the fluid into the cap 166 is created by at least one opening 124.

The pin 131 has at its portion which is in connection with the runback 122, a cross-hole 140 which meets a borehole 139 of the pin 131, in which the borehole 139 telescopes from the side which is turned away from the valve component 120 through the pin 131 to the level of the cross-hole 140, and there connects the cross-hole 140 with the borehole 139. So, the fluid can flow from the runback 122 through the cross-hole 140 and further through the borehole 139 through the interior of the pin 131 until the fluid leaves the pin 131 on the rear side which is turned to the magnetic component 110, and which meets the longitudinal borehole 162 of the armature 112. From this point, the fluid can further flow through at least one armature groove 137 into the working gap 163. So, preferably, during the operation of the electromagnetic pressure control valve 100, the total free internal space is filled with the fluid, in particular with an oil, for example a gear oil. The movability of the armature 112 within the working gap 163 is thereby ensured that in particular the at least one armature groove 137 allows a displacement of the fluid into the interior of the armature 112 and from this point through the interior of the pin 131 in direction of the supply 121. It should be noted that in FIG. 1 at least two of such armature grooves 137 are drawn in. Depending on the dimensioning, a single pin groove or a plurality of such pin grooves can be provided in different form.

Operating Mode of the Pressure Control Valve:

In FIG. 1 the non-operated state is presented, no electrical current is applied to coil 111. In this case, the armature 112 is in the presented position, the working gap 163 is opened, the globe valve 133 is maximally opened and the gate valve 134 seals the control borehole 138. Thereby, only a minimal leakage occurs from the supply 121 passing the gate valve 134. The fluid bears against the gate valve 134 via the supply 121, simultaneously the spring 135 ensures that the valve component including the gate valve is in the basic position—as described. In case that the supply 121 is constantly under pressure, the spring 135 can be omitted.

If an electrical current flows through coil 111, then at first the armature 112 is moved from the described basic position in direction of the valve component 120. Fundamentally, the maximum deflection of the armature 112 is determined or limited by the opening. At first, via pin 131 the tappet 132 is pushed in direction of the cap 166. So, the gate valve 134 bears against the spring 135 and opens the connection between the supply 121 and the load connection 123 as well as between supply 121 and runback 122. Directly behind the gate valve 134 (in direction of the magnetic component) is the described at least one tappet groove 136 which guides the fluid from the supply 121 to the load connection 123 and— because the globe valve 133 is still opened—also to the runback 122. After the gate valve 134 is opened, the pressure control valve 100 is at least partially in a linear control range, in which dependent from further increase of the electrical current through the coil 111, the pressure onto the load connection 123 is controllable. So, in increasing the electrical current in the coil 111, the armature 112 is more moved in direction of the valve component 120, a throttle function starts via pin 131 at globe valve 133 via the control borehole 141, i. e. the globe valve 133 is slowly sealed with increasing current. This effects that the fluid in an increasingly lower extent can flow from the supply 121 to the runback 122, however in return, increasingly flows from supply 121 to the load connection 123. Therewith, the pressure is increased in the load connection 123.

Preferably, the cap 166 is for example designed by means of (only) one borehole in a manner that it simultaneously has the function of an orifice.

FIG. 2A to 2E show different possibilities designing the tappet 132 from FIG. 1 and ensuring by means of different tappet grooves 136 the fluid flow from the supply both to the load connection 123 and the runback 122.

FIG. 2A shows the section through a tappet 200 which has several grooves 202 and a core form according to cross-section 201. By means of said core form, a constant motion of the tappet 200 is enabled within the control borehole 138 (see FIG. 1).

Accordingly, FIG. 2B shows a tappet 203 which has several angular grooves 205 and a cross-wise core form according to cross section 204.

FIG. 2C shows a tappet 206 with a helically revolving groove 208.

In FIG. 2D, a tappet 209 is presented which has an axial borehole through its interior and which has loading grooves 211 in defined spacings. The section through the tappet 209 is illustrated by means of the cross section 210.

FIG. 2E shows a tappet 212 with several rounded grooves 214 which are arranged according to cross section 213.

FIG. 3 shows a pressure control valve 300 with a separate guidance for the pressure means. The pressure control valve 300 relates in view of the magnetic component 310 essentially to the pressure control valve 100. Subsequently, in particular the differences to the pressure control valve 100 from FIG. 1 are discussed in detail.

The pressure control valve 300 comprises a supply 321 which enters via a supply orifice 324 the valve component 320. A spring 335 is supported by means of a fastening element 371 and bears against a gate valve 334 of a tappet 332. Behind the gate valve 334, the tappet 332 has a tappet groove 336. A duct 370 creates the connection between the tappet groove 336 and the load connection 332. The duct 370 is preferably designed as a cross-hole. Furthermore, a connection between duct 370 and the runback 322 of the pressure control valve 300 is present.

If, according to the description of FIG. 1, an electrical current flows through the coil, then the tappet 332 bears against the spring 335, the gate valve 334 opens and fluid flows through the supply orifice 324 into the tappet groove 336 and further through the duct 370 to the load connection 323. Additionally, a part of the fluid flows through the tappet groove 336 to the runback 322. If the current through the coil is further increased, then, gradually, a globe valve 333 will shut, only a reduced amount of fluid can flow from the supply 321 to the runback 322 and the pressure within the load connection 323 is increased.

FIG. 4 shows an alternative embodiment of a pressure control valve 400. The pressure control valve 400 comprises a magnetic component 410 and a valve component 420. In particular, the magnetic component comprises an armature spring 481 which is provided between the internal housing 416 and the pin 431, and which exerts a defined pressure on the relocatable armature 412, so that, in particular, said armature can be easier moved from its rest position (without electrical current flowing through the coil 411). An advantage of the armature spring 481 exists therein that the pressure force which exerts via the supply onto the tappet, preferably is completely compensated.

Furthermore, the pressure control valve comprises a runback 422, a supply 421 and a load connection 423. The supply 421 flows via two openings 424. A spring bears in the rest position (that means that no electrical current flows through the coil 411) against a gate valve 434 which essentially separates the supply 421 from the load connection 423 and the runback 422. The gate valve 434 is the terminating end of a tappet 432, said tappet preferably has grooves 436 which—during opened gate valve 434—ensure a fluid flow from supply 421 to the load connection 423 and to the runback 422. A tappet orifice 480 is provided at one position as a groove which is extendedly designed compared to the other grooves, so that directly after the opening of the gate valve 434 via said tappet orifice 480 the fluid can flow from the supply 421 to the load connection 423 (and to the runback 422).

In the following, possible embodiments for a tappet 432 are described in detail which comprises according to FIG. 4 a tappet orifice 480.

FIG. 5A shows a tappet 500 comparable with the tappets 209 from FIG. 2D. The tappet 500 comprises loading grooves 501 and additionally a tappet orifice 502 at its lower end, directly above the gate valve. If, as initially described, the tappet is pushed downwards, then, via the tappet orifice 502, the fluid can flow from the supply to the load connection and to the runback.

A comparable principle shows a tappet 503 according to FIG. 5B. Here, several grooves 504 are present, in which one groove close to the gate valve is provided in a lower manner. This ensures the function of a tappet orifice 505 according to the above comments.

FIG. 5C shows a tappet 506 with several cross-holes 507 and a valve orifice 508 close to the gate valve 510 according to the above-described principle. The cross section 509 shows the course of the ducts through the tappet.

FIG. 6 shows an adapter 600 with a tappet 601. Thereby, the tappet 601 can also be designed in a manner being extended upwards (not shown). The fluid is guided via a supply 605 to load connection 602 and to a runback (not shown). The tappet 601 has in its lower portion a recess 603 which, in particular, is designed as a section with lower diameter. Preferably, the recess 603 is designed as a cut-in, so that the tappet 601 at this point in connection with the borehole 607 results in an annular gap, said annular gap corresponds to an orifice between supply 605 and load connection 602. A gate valve 604 is provided at the lower end of the tappet 601 which can seal the borehole 605 preferably completely.

If the tappet 601 is actuated by means of the electromagnet (not shown in FIG. 6) in direction to supply 605, then the gate valve 604 enables a fluid flow thereby by leaving the borehole 607. The fluid flows from supply 605 to the load connection 602 and via a duct 606 which can be designed as recess, preferably in form of a borehole or a groove, further to the runback. The flow from the runback is controllable by means of a globe valve in a manner that the intensity of the fluid flow from supply 605 to the load connection 602 can be adjusted via the globe valve.

LIST OF LITERATURE

[1] EP 1 004 066

LIST OF REFERENCE NUMERALS

100: pressure control valve
110: magnetic component
111: coil
112: locatable armature
113: connection assembly
114: coil core
115: housing
116: internal housing
117: coil body
118: coil housing
119: pole flange
120: valve element
121: supply
122: runback
123: load connection
124: opening
130: valve element
131: pin
132: tappet
133: globe valve
134: gate valve
135: spring
136: tappet groove
137: armature groove
138: control borehole
139: borehole 140: cross-hole
141: control borehole
160: nose
161: shaping
162: longitudinal borehole
163: working gap
164: completion geometry
165: adapter
166: cap
200: tappet
201: cross section
202: groove
203: tappet
204: cross section
205: groove
206: tappet
207: cross section
208: groove
209: tappet
210: cross section
211: loading groove
212: tappet
213: cross section
214: groove
300: pressure control valve
310: magnetic component
320: valve element
321: supply
322: runback
323: load connection
324: supply orifice
332: tappet
333: globe valve
334: gate valve
335: spring
336: tappet groove
370: duct
371: fastening means
400: pressure control valve
410: magnetic component
411: coil
412: armature
416: internal housing
420: valve element
421: supply
422: runback
423: load connection
424: opening
431: pin
432: tappet
433: globe valve
434: gate valve
435: spring
436: tappet groove
480: tappet orifice
481: armature spring
500: tappet
501: groove (loading groove)
502: tappet orifice
503: tappet
504: groove
505: tappet orifice
506: tappet
507: cross-hole
508: tappet orifice
509: cross section
510: gate valve
600: adapter
601: tappet
602: load connection
603: recess
604: gate valve
605: supply
606: duct
607: borehole

The invention claimed is:

1. Pressure control valve comprising:
a magnetic component comprising an electrical coil and a relocatable armature, and
a valve component comprising a supply, a runback, a load connection and a valve element that interacts with the armature,
wherein the valve element comprises:
a gate valve operative to seal the supply from the load connection and the runback,
a globe valve operative to seal the runback from the supply,
a pin which interacts with the armature, and
a tappet actuated via the pin, the tappet having an orifice proximate the gate valve.

2. Pressure control valve according to claim 1, wherein the gate valve (134) is formed as a first sealing element.

3. Pressure control valve according to claim 1, wherein the globe valve (133) is formed as a second sealing element.

4. Pressure control valve according to claim 1, wherein the pin (131) comprises a recess, in particular a borehole (139) and/or a cross-hole (140) through which a fluid flows into the interior of the magnetic component (110).

5. Pressure control valve according to claim 1, wherein the pin (131) or armature (112) has means for the fluid guidance (137), so that in particular the armature (112) is relocatable within the coil housing (118).

6. Pressure control valve according to claim 5, wherein the means for the fluid guidance is a pin groove (137) on the exterior of the pin (131).

7. Pressure control valve according to claim 1, wherein the tappet has a plurality of grooves formed thereon and the orifice is formed by one of the grooves extending farther along the tappet toward the gate valve than the other grooves.

8. Pressure control valve according to claim 1, wherein the gate valve (134) is formed as a portion of the tappet (132).

9. Pressure control valve according to claim 1, wherein the tappet (132) is formed in a manner that a fluid can flow at least partially along a control borehole (138) which surrounds said tappet.

10. Pressure control valve according to claim 9, wherein the fluid flows through at least one tappet groove (136, 202, 205, 208, 211, 214).

11. Pressure control valve according to claim 10, wherein the tappet groove (136, 202, 205, 208, 211, 214) is formed in an angular or round manner.

12. Pressure control valve according to claim 9, wherein the fluid flows through a cavity within the tappet (132, 200, 203, 206, 209, 212).

13. Pressure control valve according to claim 9, wherein the fluid flows through a thread-shaped round groove (208) of the tappet (132, 206).

14. Pressure control valve according to claim 9, wherein a spring (135) is provided which pushes the tappet (132) in direction of the pin (131).

15. Pressure control valve according to claim 1, wherein:
the valve component has a borehole extending between the supply and the load connection, the borehole having an inner wall, the tappet has a section with a narrowed diameter located in the borehole proximate the gate valve, and the orifice is formed by an annular gap between the narrowed diameter section and the inner wall of the borehole.

16. Pressure control valve according to claim 1, wherein the orifice comprises a cross-hole.

17. Pressure control valve according to claim 1, wherein a spring (481) is provided in the magnetic component by means of which a spring force is exerted onto the armature (112, 412).

18. Pressure control valve according to claim 17, wherein the spring (481) is provided between an internal housing (416) and the armature (112, 412).

19. Pressure control valve according to claim 17, wherein the spring (481) is provided between an internal housing (416) and the pin (131, 431).

20. Pressure control valve according to claim 1, wherein an additional duct between the supply (121) and the load connection (123) is provided which is essentially sealable by means of the gate valve (134).

21. Pressure control valve according to claim 1, wherein by means of the control of the globe valve (133) via the electrical current which flows through the coil (111), the pressure at the load connection (123) is adjustable over an at least partially essentially linear range.

22. Pressure control valve according to claim 1, wherein the magnetic component (110) comprises a coil core (114) which is provided at least partially dipping into the coil (111).

23. Pressure control valve according to claim 1, wherein the gate valve (134) is provided within the supply (121) of the valve element (120).

24. Pressure control valve according to claim 1, wherein the globe valve (133) is provided in the runback (122) of the valve component (120).

* * * * *